United States Patent [19]

Catros et al.

[11] Patent Number: 4,679,079
[45] Date of Patent: Jul. 7, 1987

[54] METHOD AND SYSTEM FOR BIT-RATE COMPRESSION OF DIGITAL DATA TRANSMITTED BETWEEN A TELEVISION TRANSMITTER AND A TELEVISION RECEIVER

[75] Inventors: Jean-Yves Catros, Rennes; Denis Michler, Acigne, both of France

[73] Assignee: Thomson Video Equipment, Gennevilliers, France

[21] Appl. No.: 717,884

[22] Filed: Mar. 29, 1985

[30] Foreign Application Priority Data

Apr. 3, 1984 [FR] France ............................ 84 05330

[51] Int. Cl.⁴ ........................................... N04N 7/12
[52] U.S. Cl. .................................. 358/135; 358/12; 358/136
[58] Field of Search ................ 358/12, 135, 136, 133, 358/13

[56] References Cited

U.S. PATENT DOCUMENTS

| | | | |
|---|---|---|---|
| 3,761,613 | 9/1973 | Limb | 358/136 |
| 4,144,543 | 3/1979 | Koga | 358/136 |
| 4,217,609 | 8/1980 | Hatori et al. | 358/136 |
| 4,371,895 | 1/1981 | Koga | 358/136 |
| 4,571,618 | 2/1986 | Hatori et al. | 358/136 |
| 4,583,114 | 4/1986 | Catros | 358/135 X |

FOREIGN PATENT DOCUMENTS 2003001 2/1979 United Kingdom .

OTHER PUBLICATIONS

"ADPCM System Based on a Composite Image Model", I. J. Dukovich; IEEE Transactions on Communications; vol. 31, #8, pp. 1003–1017; Aug. 83.
"Interframe Picture Coding at Low Bit Rates with Great Error Resistance", Temime; ICC Conference, Jun. 1980, pp. 31.5, 1–5.

Primary Examiner—James J. Groody
Assistant Examiner—Victor R. Kostak
Attorney, Agent, or Firm—Cushman, Darby & Cushman

[57] ABSTRACT

A method and the system for bit-rate compression of digital data between a television transmitter and receiver employs at the transmitter a differential coding device comprising a code allocator coupled respectively to the outputs of predictors which deliver the spatial prediction errors of the contour areas or highly textured areas of the image, the spatial prediction errors of the uniform areas and the temporal prediction errors of the uniform and fixed areas. The code allocator is controlled by a selecting device which selects one output of the predictors for applying a prediction error value to the input of a coding structure of the code allocator in order to code each datum of a current point applied to the input of a predictor in three different fixed-length codes, depending on whether the current point is located in a contour area or highly textured area of the image or whether the current point is located in a fixed or moving uniform area.

10 Claims, 9 Drawing Figures

METHOD AND SYSTEM FOR BIT-RATE COMPRESSION OF DIGITAL DATA TRANSMITTED BETWEEN A TELEVISION TRANSMITTER AND A TELEVISION RECEIVER

BACKGROUND OF THE INVENTION

1. Field of the Invention

This invention relates to a method and a system for bit-rate compression of digital data transmitted between a television transmitter and a television receiver.

2. Description of the Prior Art

In digital television, the luminance and color-difference signals are digitized in eight bits per image point with a structure and a sampling frequency which depend on the problem to be solved. These data are usually transmitted in real time with a very high raw-data bit rate which is higher than 140 megabits per second, thus making it necessary to reduce this bit rate in order to permit the use of existing transmission media by utilizing the high redundancy of these data.

Different methods and devices for bit-rate reduction are already known. Among these, the methods of coding by modulation of differential coded pulses are particularly attractive by reason of their simplicity of application. Known methods of differential coding consist in coding the difference between the value of a sample of the signal to be transmitted and an estimation, or prediction, computed from the values of the preceding samples already coded, this difference being quantized by a quantizer having n quantization levels. With each level i is associated a code $C_i$ which is transmitted over the line or transmission channel. The received code is converted to its real value which is subsequently added to a prediction value computed by the receiver in order to reconstruct the signal. By means of a negative-feedback loop, a prediction can be made at the transmitter and is identical with the prediction formulated at the receiver.

The systems which make use of these methods are of particular interest when the transmitted data are constituted by binary code words of fixed length and when spatial coding is employed, that is, coding which takes into account only states of points which are geographically adjacent to each point to be coded and belong to the same television frame as the point to be coded. In fact, the use of fixed-length code words eliminates the problems of management of the buffer memories which are necessary for adapting a variable bit rate of the source to the fixed bit rate of the channel which connects the transmitter to the receiver, and spatial coding makes it possible to avoid systematic use of an image memory.

However, these systems cannot be employed for television image transmission when the bit rates fall below four bits per transmitted image point since, below this value, the quality of the reconstructed image at the receiver is no longer acceptable. Furthermore, coding which consists for example of three bits per point entails the use of spaced quantization levels which make it difficult to reproduce the image at the receiver, both in regard to the image points contained in the uniform zones or uniform areas and in regard to the image points contained in the contour areas (zones) or highly textured areas. It is found in practice that, in the uniform areas of the image, slight variations in luminance are directly observed by the eye. In order to overcome this defect, it is preferable to quantize the luminance signal of the uniform areas by means of quantizers having closely spaced levels in order to prevent excessive amplification of small luminance variations which might otherwise cause false contours to appear in the vicinity of the zero prediction error. On the other hand, quantization by means of spaced reconstruction levels appears to be better suited to coding of the points located in the contour areas. However, in the second case just mentioned, the spacing between two levels cannot exceed a predetermined limit since the contours which appear beyond this limit are reproduced in the form of stair-steps.

In order to solve these difficulties, one known method consists in changing-over the quantizers to two different quantization characteristics as a function of the local appearance of the image point to be transmitted. For example, in the case of points located in uniform areas of the image, coding is performed by means of a quantizer having closely-spaced reconstruction levels in the vicinity of the zero prediction error. In the case of points located in contour areas or textured areas of the image, a quantizer having high reconstruction levels is employed. However, this method again presents the problem of constructional design of receiving devices which have to identify the instants of any change in quantization and/or prediction characteristics carried out by the transmitter.

If a changeover of the quantization characteristics takes place on points which are not known at the receiver and constitute a non-causal neighborhood for the image points to be decoded, the transmitter must provide the receiver with indications of changes in quantization and/or prediction characteristics. In this case, even if a fixed-length code is employed for coding the quantized prediction errors, the bit rate of each image line is variable and this gives rise to complex problems of management of buffer memories in order to adapt the variable bit rate of the transmitter to the fixed bit rate of the transmission channel.

On the other hand, if the indication relating to a change in quantization and/or prediction characteristics is not transmitted to the receiver, the change in characteristic is obtained in an identical manner at the transmitter and at the receiver from tests carried out on image points which are already known at the receiver and constitute the causal neighborhood of the point to be decoded. Under these conditions, if a fixed-length code is employed, the bit rate of each image line is constant since the only information to be transmitted is the value of the quantized prediction error. However, a problem is presented when, in certain cases, a causal neighborhood does not alone suffice to find the best characteristic of the quantizer or predictors to be employed. This is a particularly crucial problem when the points of the image to be quantized are located within a transition area between a uniform area and a contour area of the image and when this uniform area moves within the image.

SUMMARY OF THE INVENTION

An object of the present invention is to overcome the disadvantages mentioned in the foregoing.

Accordingly, the invention relates to a method of bit-rate compression of digital data transmitted between at least one television transmitter and a television receiver, the data being representative of the values of luminance and/or of chrominance of each point of a television image and being coded at the transmitter by means of a differential coding device of the type comprising at least one predictor, a quantizer, a device for reconstruction of the transmitted datum and a code allocator. Said data are decoded at the receiver by a differential decoder comprising at least one code converter, a predictor and a device for reconstruction of the transmitted datum. The method consists in coding the data relating to each current point to be transmitted by means of a first predictor and a first quantizer when the point belongs to a contour area, in coding the data relating to each point of a uniform or slightly textured area by means of at least a second predictor and a second quantizer, and in decoding each received coded datum at the receiver by means of a prediction characteristic which is identical with the characteristic previously employed at the transmitter for coding the received datum code. The method essentially compresses the process of comparing the prediction errors of each predictor of the transmitter and of the receiver with at least one predetermined error threshold value in order to code the current point data at the transmitter by means of different code words of fixed length, depending on whether the results of comparisons of the errors of prediction of the points adjacent to the current point already transmitted to the receiver indicate that the point is in a contour area or in a uniform area and in order to switch the receiver to a predictor which has the same prediction characteristic as the predictor employed earlier for coding the current point datum at the transmitter.

The invention is also directed to a system for bit-rate compression of digital data between a transmitter and at least one television receiver for the practical application of the method aforesaid.

BRIEF DESCRIPTION OF THE DRAWINGS

Other features of the invention will be more apparent upon consideration of the following description and accompanying drawings, wherein.

DETAILED DESCRIPTION OF THE INVENTION

Figure 1:
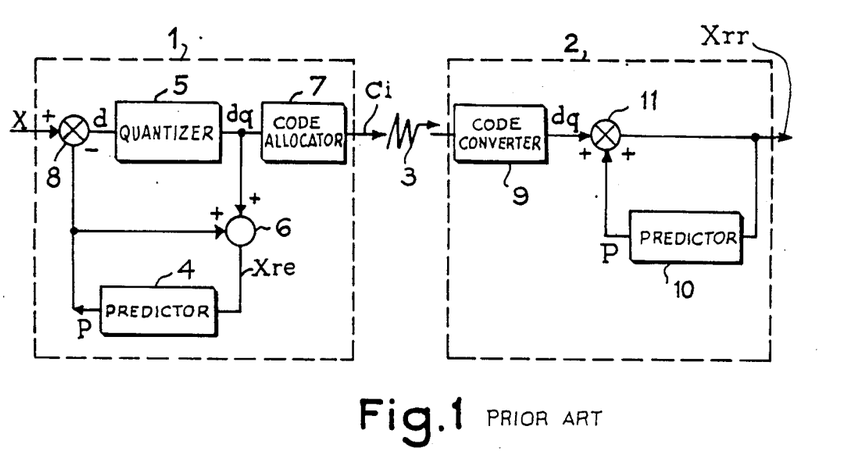
FIG. 1 represents a system for bit-rate compression of digital data transmitted between a transmitter and a receiver by making use of a known type of differential coding-decoding device.

The known differential coding-decoding system shown in FIG. 1 is constituted at the transmitter end by a differential coding device 1 represented within a dashed-line rectangle and at the receiver end by a differential decoding device 2 which is also represented within a dashed-line rectangle. The output of the coding device 1 is connected to the input of the decoding device 2 via a transmission channel 3. The differential coding device 1 comprises : a predictor 4, a quantizer 5, a transmitted-datum reconstruction device 6 as well as a code allocator 7. The datum X to be transmitted is applied to the input of a subtracter 8, the other input of which is connected to the output of the predictor 4. The predictor 4 delivers a prediction value P. The datum X to be coded reduced by the value of prediction P is applied in the form of the difference $d = X - P$ to the input of the quantizer 5 via the output of the subtracter 8 in order to be quantized in n levels. At each quantization level i, a code allocator 7 associates a code $C_i$ which is transmitted over the line or the channel 3. The quantization level dq delivered by the quantizer 5 and corresponding to the prediction difference or error $X - P$ is applied to the input of the transmitted-datum reconstruction device 6 which is usually constituted by an adder and the other input of which is connected to the output of the predictor 4. The reconstructed datum $X_{re}$ transmitted at the output of the transmitted-datum reconstruction device 6 is applied to the input of the predictor 4. The code $C_i$ is received by the decoding device 2 which is constituted by a code converter 9, a predictor 10 and a received-datum reconstruction device 11. The code converter 9 reconstitutes the quantization levels dq in order to apply them to a first input of the received-datum reconstruction device 11. The received-datum reconstruction device 11 (usually consisting of an adder) receives at another input the value of prediction P' computed by the predictor 10 and delivers at its output the value $X_{rr}$ of the received reconstructed datum.

The quantization operation performed by the quantizer 5 makes it possible to associate a single code value $C_i$ with all the difference values $X - P$ comprised between two thresholds $S_i$ and $S_{i+1}$. This operation is carried out with the aid of the code allocator 7 and permits the achievement of bit-rate reduction in differential coding. In the event that there is no transmission error and if the prediction functions of the predictors 4 and 10 are the same both at the transmitter and at the receiver, the reconstructed values $X_{re}$ and $X_{rr}$ respectively at the transmitter and at the receiver are identical.

The method and the system in accordance with the invention entail the use of a differential coding system which corresponds to that described in FIG. 1 except for the fact, however, that they employ a number of coding structures composed of predictors and quantizers having different characteristics, each structure being employed as a function of the local environment of each image point to be coded. For example, in order to form image contour areas or highly textured image areas with a single intra-image prediction characteristic, a quantizer having appreciably spaced reconstruction levels is employed. On the other hand, in uniform or slightly textured areas, the quantization characteristics employed comprise reconstruction levels which are distinctly more closely spaced in the vicinity of the zero prediction error. An inter-frame temporal or time predictor which takes into consideration the state of a number of points located in different frames is also employed for the points located in the stationary uniform areas of the image, and an intra-frame spatial predictor which takes into consideration only the states of the image points located within each frame is utilized for the purpose of coding points located in the moving uniform areas of the image. A device for switching between each of these structures permits a changeover to the coding characteristic which is best suited as a function of the local shape of the image points which surround each current point to be coded. The indication of a change in coding structure is produced in an identical manner both at the transmitter and at the receiver by means of tests performed on the points which are known at the receiver and the points already coded by the transmitter, with the result that it proves unnecessary to transmit the indication relating to a change in coding structure over the transmission channel which connects the transmitter to the receiver.

Figure 2:
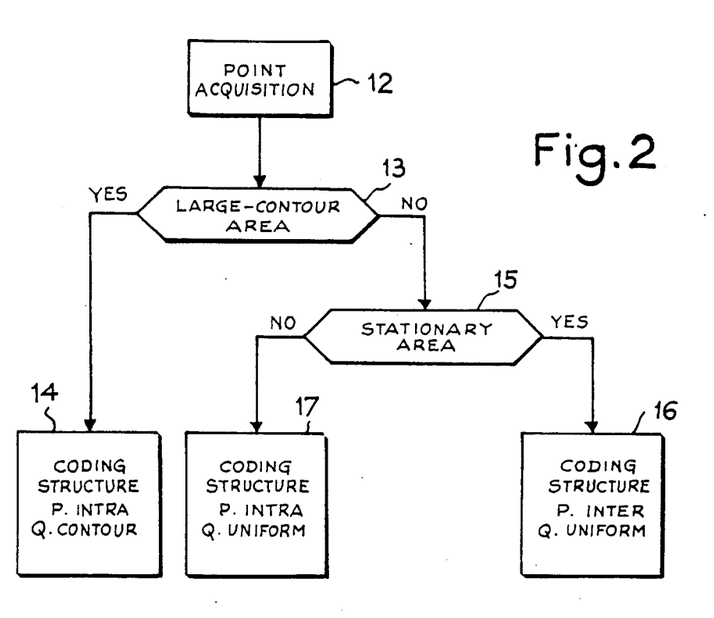
FIG. 2 is a flow diagram illustrating the changeover steps for the coding structures in accordance with the invention.

In order to introduce no additional information, the changeover criterion elaborates its choice by utilizing the characteristics of the image points already known at the receiver. Two successive tests illustrated in the flow diagram of FIG. 2 serve to distinguish the state of belonging of the image points to three types or classes of areas. The order of tests defined in FIG. 2 consists in examining (at the time of a first test carried out in step 13 on each current point acquired in step 12) the state of belonging or of non-belonging of said point to a large-contour area or highly textured area of the image. If it is revealed in step 13 that the current point belongs to a large-contour area or to a highly textured area, the circuits of the coder and decoder are changed-over in step 14 to coding structures comprising a quantization characteristic having widely-spaced reconstruction levels and to an intra-frame predictor, the prediction characteristic of which involves only the adjacent points of the current point under examination. On the other hand, if it is declared in step 13 that the point does not belong to a large-contour area or a highly textured area of the image, a second test is performed in step 15 which consists in ascertaining the moving or stationary state of the area to which the current point of the scanned image belongs. If the uniform area which includes the current point is declared as stationary in step 15, the circuits of the coder and decoder are switched in step 16 to a specific coding structure composed firstly of a quantizer having a quantization characteristic which possesses distinctly more closely-spaced reconstruction levels in the vicinity of the zero prediction error and secondly of a predictor having an inter-frame prediction characteristic which takes into account the points adjacent to the point corresponding to the current point in the preceding image frame. If on the other hand the uniform area in which the scanned current point is located is declared as moving in step 15, a coding structure comprising a quantizer having a quantization characteristic which possesses closely-spaced reconstruction levels, and a predictor comprising an intra-frame prediction characteristic are accordingly employed (step 17). This double changeover of coding structures makes it possible to dissociate three classes of areas in the image. Thus a first class consists of the fixed or moving large-contour areas detected during the test performed in step 13, a second class consists of the fixed small-contour or uniform areas and, finally, a third class consists of the moving small-contour uniform areas detected by means of the tests of step 15.

Figure 3:
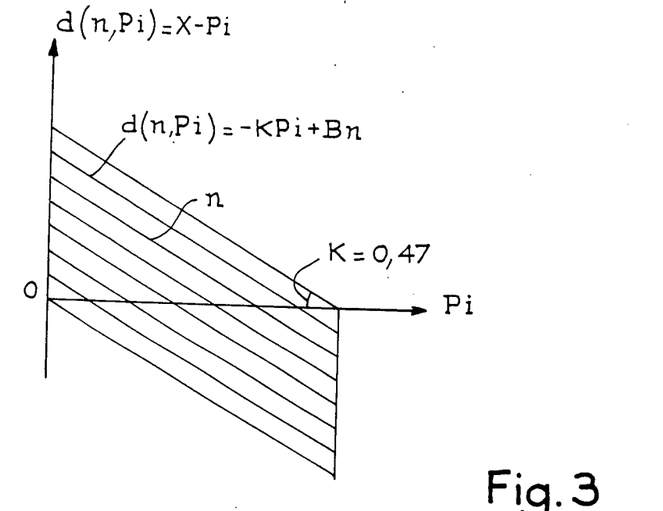
FIG. 3 represents a quantization characteristic adapted to coding of the points located in the contour areas or highly textured areas of the image.

FIG. 3 shows a prediction characteristic which is specially adapted to coding of the points located in the contour areas or highly textured areas of the image.

This characteristic is linear and defined by an array of parallel lines in a system of rectangular or cartesian coordinates in which the prediction values $P_i$ are plotted on the axis of abscissae and the prediction errors $d(n, P_i) = X - P_i$ are plotted on the axis of ordinates, each straight line of the array being defined by the relation $d(n)\ P_i = -k\ P_i + B_n$ where k is a natural number which is smaller than or equal to 1;

n represents the code allocated as a function of the prediction level $P_i$ and of the prediction error $X - P_i$; and $B_n$ represents the prediction error in respect of the zero prediction level.

In a particular embodiment of the invention, a value of k in the vicinity of 0.47 with eight quantization levels can be chosen for the purpose of coding each prediction error on a binary length of three bits.

Figure 4:
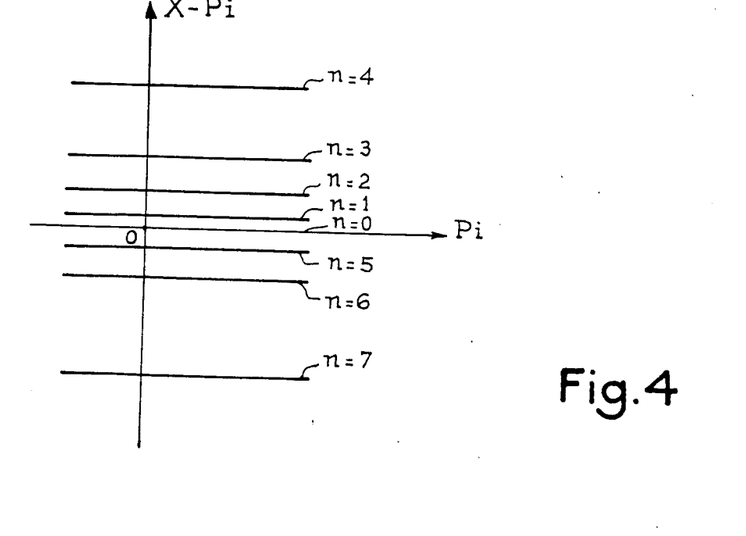
FIG. 4 is a representation of a quantization characteristic adapted to coding of the points located in uniform areas of the image.

FIG. 4 represents the quantization characteristic employed for coding points belonging to the uniform areas of the image. This characteristic has eight levels in which the levels are closely spaced in the vicinity of the zero prediction error $X - P_i$.

Figure 5:
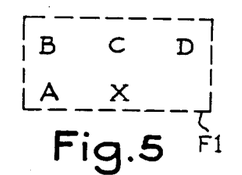
FIG. 5 shows the arrangement of a window of points which are distributed in proximity to a scanned current point within a television frame and to which the intraframe tests are applied.

Among the tests performed in steps 13 and 15 of the method aforesaid, the first test carried out in step 13 appears to be the most critical and its effectiveness is determined according to the fineness of follow-up of the contours or highly textured areas of the image. A delay in changeover of coding structures caused by transition from a uniform area to a contour area results in jagged reconstruction of contours. A delay in changeover of the same structures at the time of transition from a contour area to a uniform area results in the appearance of granular noise in the uniform areas which follow the contours. These time-delays can be minimized by a judicious choice of the parameters which define the criteria governing the changeover of the coding structures. This choice applies both to the definition of a window of points which surrounds each scanned current point and within which the test is intended to be performed as well as to the manner in which the test itself is carried out. A window F1 of points which produces good results is illustrated in FIG. 5. This window is composed of the current point X located in promimity to adjacent points A, B, C, D. The points A and X are located on the same image-scanning line and the points B, C, D are located in this order on the preceding scanning line, the points B and C being located respectively in a vertical position above the points A and X. The test of step 13 is performed by determining the largest of the reconstructed intra-image prediction errors EPn in the window F of FIG. 5, each reconstructed prediction error being determined by calculating the difference between the value of luminance of the reconstructed point and the reconstructed intra-image prediction relating to this point. Should the largest of the errors EPn prove to be below a predetermined threshold S, the area surrounding the scanned point X is declared to be a uniform area or small-contour area. On the other hand, if the largest of the prediction errors EPn is higher than the predetermined threshold S, the area surrounding the scanned point X is declared to be a contour area or a highly textured area of the image.

The second test performed in step 15 takes place in a less critical manner. Its general principle is similar to the principle adopted for the preceding test except for the fact, however, that the calculated error is no longer the maximum intra-image prediction error in the window F1 but a maximum inter-image temporal prediction error in a temporal window F2 (not shown). The temporal window F2 is composed both of the points of the current frame adjacent to the scanned current point and of the points which may or may not correspond to the preceding frame. This maximum temporal prediction error is obtained by measuring the largest of the temporal prediction errors of the values of each reconstructed point in the temporal window F2, each temporal prediction error being equal to the value of luminance of the reconstructed point minus its reconstructed temporal prediction. If the maximum value of the errors in measured temporal prediction is below a predetermined threshold value S', the area corresponding to the scanned point is stated to be moving and uniform. On the other hand, if the maximum value E'Pn of the errors in measured temporal prediction is higher than the predetermined threshold value S', the corresponding area is stated to be moving and uniform. For the sake of convenience of construction, the second test can be preferably carried out with a window F2 constituted by points in each frame, which is identical with the window F1 shown in FIG. 5 and previously employed for the first test.

Figure 6:
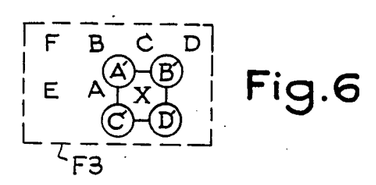
FIG. 6 shows the arrangement of a window of points composed of inter-frame points geographically disposed on two consecutive juxtaposed frames in proximity to the scanned current point in the television image, said window being employed for computing inter-frame temporal prediction values.

In the calculations, all the points within the windows described in the foregoing are not necessarily taken into consideration in all cases. For example, the predictor of the coding structures of steps 14 and 17 could take into account only the points A and C of the window of FIG. 5 if it has an operator structure which enables it to establish the arithmetical mean of the reconstructed values $X_{re}$ of the luminance values of each point A and C, the point A being the point which precedes the current point X on the same line and the point C being the point corresponding to the current point on the preceding image-scanning line. Similarly, the inter-frame predictor of the coding structure employed in step 16 could be constituted by a simple temporal predictor which takes into account only the reconstructed values of the image points A', B', C' and D' of the preceding frame which surrounds the scanned current point, and the reconstructed value of the point C of the current frame constituted by the point corresponding to the current point located on the previous scanning line. The window F3 employed for computing the inter-frame temporal prediction is shown in FIG. 6.

The general arrangement of a device for carrying out the method in accordance with the invention will be described hereinafter with reference to the diagram of FIG. 7. This figure illustrates a structure which is applicable both to the transmission device and to the reception device of the differential coding system in accordance with the invention. The common structures forming part of the transmission and reception devices are shown in full lines in the figure. The device illustrated in FIG. 7 comprises an estimational spatial predictor 18 for contour areas, an estimational spatial predictor 19 for uniform moving areas, a device 20 for reconstruction of the input datum X, a temporal predictor 21 for fixed uniform areas, a selection device 22, and a code allocator 23 shown in dashed outline and employed solely at the transmitter for computing the codes to be transmitted.

The predictor 18 receives on a first input the datum X to be coded if it is located in the transmission unit or the code CX received by the transmission channel if it is located in the reception unit. The predictor 18 is connected by means of a second input to the output of the temporal predictor 21 which transmits to said predictor 18 the value of the temporal prediction $\hat{P}_{t,n}$ of the fixed uniform areas and is connected by means of a third input to the output of the spatial predictor 19 of the moving uniform areas. The predictor 18 computes a prediction value $\alpha.\hat{P}_{s,n+1}$ which represents the estimational spatial prediction of the contour areas. The output of the predictor 18 is connected in a feedback loop to a fourth input of this latter so as to permit recording of each new computed value $\alpha.\hat{P}_{s,n+1}$ for computing the prediction of the following point. The estimational spatial predictor of the moving uniform areas 19 has four inputs: a first input receives the datum X of the point to be coded if it is located in the transmission unit or the received code CX is it is located in the reception unit; the second input is connected to the output of the temporal predictor 21 which transmits the temporal prediction $\hat{P}_{t,n}$; the third input is connected to the output of the contour-area spatial predictor 18; the fourth input is connected to the output of the predictor 19 in order to record the result of the preceding computed prediction at each computation of a new prediction value. The device for reconstruction of the input datum 20 has four inputs: a first input is connected to the output of the predictor 19; a second input is connected to the output of the predictor 18; a third input receives the datum X to be coded or the code CX transmitted over the transmission channel, depending on whether the device 20 is placed within the transmission unit or within the reception unit. The fourth input of the device 20 is connected to the output of the predictor 21 for transmitting the temporal prediction information $\hat{P}_{t,n}$. The device 20 transmits on its output the reconstructed value $\hat{X}_{re}$ of the input datum X. The code allocator 23 which is employed solely for transmission is connected to the respective outputs of the predictors 18, 19 and 21 and to the outputs of the selecting device 22 for computing the corresponding codes resulting from selection of one of the predictors 18, 19 or 21 by the selecting device 22.

The temporal predictor 21 of the fixed uniform areas comprises a temporal predictor 24 connected to the output of the device 20 for reconstruction of the input datum via a point line memory 25, a frame memory 26 interposed between a device 27 for computing inter-frame predictions and the output of the temporal predictor 24. The temporal predictor 24 is an inter-frame predictor which computes the arithmetical mean $\hat{P}(t) = \frac{1}{4}(\hat{A} + \hat{B} + \hat{C} + \hat{D})$ of the reconstructed data $\hat{A}$, $\hat{B}$, $\hat{C}$ and $\hat{D}$ of the points A, B, C, D which are stored in the point line memory 25. The computation result P(t) is stored within the frame memory 26 so as to be subsequently applied to a first input of the device 27 for computing inter-frame predictions. This device multiplies the computed prediction $\hat{P}(t)$ by a coefficient $\gamma$ in order to obtain the product $\gamma\hat{P}(t)$ and in order to add the product $\gamma\hat{P}(t)$ to a product $\beta\hat{C}$, where $\beta$ is a coefficient and $\hat{C}$ represents the value of the reconstructed datum of the point C of the current frame corresponding to the point X scanned on the preceding line. The result of computation of the function $\gamma\hat{P}t + \beta\hat{C}$ corresponds to the value of the temporal prediction of the fixed uniform areas $\hat{P}_{t,n}$ which is transmitted to the inputs of the predictors 18 and 19, of the device 20 for reconstruction of the transmitted datum and of the code allocator 23.

The selecting device 22 comprises a first device 28 for error computation of spatial predictions, a device 29 for computation of temporal prediction errors, a line memory 30 for spatial prediction errors, a line memory 31 for temporal prediction errors as well as two selecting logics 32, 33 for controlling the predictors 18 and 19, the device 20 for reconstruction of the transmitted datum as well as the code allocator 23 of the transmission unit. The device 28 for computation of spatial prediction errors has two inputs connected respectively to the output of the predictor 19 and to the output of the device 20 for reconstruction of the transmitted datum. In addition, the device 29 for computation of temporal prediction errors has two inputs connected respectively on the one hand to the output of the device 20 for reconstruction of the transmitted datum and on the other hand to the output of the predictor 21 for transmitting the temporal prediction value $\hat{P}_{t,n}$ delivered by the output of the device 27 for computation of inter-frame predictions. The outputs of the devices 28 and 29 are connected respectively to the data inputs of the line memories 30 and 31. The memory 30 stores the spatial prediction errors computed successively in respect of each point scanned on one image line and the memory 31 stores the temporal prediction errors computed in respect of each point scanned successively on one image line. The outputs of the memories 30 and 31 are connected respectively to the inputs of the selecting logics 32 and 33. The memories 30 and 31 are so arranged as to apply to the respective inputs of the selecting logics 32 and 33 for the prediction errors $\hat{E}_{1B}$, $\hat{E}_{1C}$, $\hat{E}_{1D}$, and $\hat{E}_{2D}$, $\hat{E}_{2C}$ and $\hat{E}_{2B}$ computed in respect of the points B, C, D of the preceding line which are directly adjacent to the scanned current point X and the prediction errors $\hat{E}_{1A}$ and $\hat{E}_{1A}$ obtained at the outputs of the devices 28 and 29 for computation of spatial and temporal prediction errors. The points A, B, C, D are located in accordance with the arrangement of the window for scanning the image points shown in FIG. 5 in order to compare them within the selecting logics 32 and 33 with the preselected switching thresholds. As a result of these comparisons, the selecting logics 32 and 33 deliver the selection signals R, S, T. The signal R assumes the logic level "1" when the scanned current point belongs to a contour area or highly textured area of the image, the signal S assumes the logic level "1" when the scanned current point belongs to a moving uniform area of the image, and the signal T assumes the logic value "1" when the scanned current point corresponds to a fixed uniform area of the image.

If QZC designates the operator of the quantizer employed for quantizing the points located in contour areas and QZU designates the operator of the quantizer employed for quantizing the points located in the uniform areas, the functions F1, F2 of the operators of the predictors 18, 19 and the function F3 of the reconstruction operator of the transmitted datum 20 of the transmission coder are defined as follows:

$$a \cdot \hat{P}_{s,n} + 1 = F1\ (X, \hat{P}_{s,n}, \hat{P}_{t,n}, a\hat{P}_{s,n}) \quad (1)$$

$$= a\left(\frac{\hat{X} + \hat{D}}{2}\right) \text{ at the instant } t$$

-continued $$= a\left(\frac{\hat{A} + \hat{C}}{2}\right) \text{ at the instant } t + 1$$

$$\hat{P}_{s,n} + 1 = F2\ (\hat{X}, \hat{P}_{s,n}, \hat{P}_{t,n}, a\hat{P}_{s,n}) \quad (2)$$

$$= \left(\frac{\hat{X} + \hat{D}}{2}\right) \text{ at the instant } t$$

$$= \left(\frac{\hat{A} + \hat{C}}{2}\right) \text{ at the instant } t + 1$$

$$\hat{X} = F3\ (X, \hat{P}_{s,n}, a\hat{P}_{s,n}, \hat{P}_{t,n}) \quad (3)$$

If $R = 1$ $$a\hat{P}_{s,n} + 1 = \frac{a}{2}\ [QZC(X - a\hat{P}_{s,n}) + a\hat{P}_{s,n} + \hat{D}]$$

$$= \left\{\frac{a}{2}\ QZC(X - a\hat{P}_{s,n})\right\} + \left\{\frac{a}{2}\ (a\hat{P}_{s,n} + \hat{D})\right\}$$

$$\hat{P}_{s,n} + 1 = \frac{1}{2}\ \{QZC(X - a\hat{P}_{s,n})\} + \frac{1}{2}\ (a\hat{P}_{s,n} + \hat{D})$$

$$\hat{X} = QZC(X - a\hat{P}_{s,n}) + a\hat{P}_{s,n}$$

If $S = 1$ $$a\hat{P}_{s,n} + 1 = \frac{a}{2}\ [QZU(X - \hat{P}_{s,n}) + \hat{P}_{s,n} + \hat{D}]$$

$$= \left\{\frac{a}{2}\ QZU(X - \hat{P}_{s,n})\right\} + \left\{\frac{a}{2}\ (\hat{P}_{s,n} + \hat{D})\right\}$$

$$\hat{P}_{s,n} + 1 = \frac{1}{2}\ \{QZU(X - \hat{P}_{s,n})\} + \frac{1}{2}\ (\hat{P}_{s,n} + \hat{D})$$

$$\hat{X} = QZU(X - \hat{P}_{s,n}) + \hat{P}_{s,n}$$

If $T = 1$ $$a\hat{P}_{s,n} + 1 = \frac{a}{2}\ [QZU(X - \hat{P}_{t,n}) + \hat{P}_{t,n} + \hat{D}]$$

$$= \left\{\frac{a}{2}\ QZU(X - \hat{P}_{t,n})\right\} + \left\{\frac{a}{2}\ (\hat{P}_{t,n} + \hat{D})\right\}$$

$$\hat{P}_{s,n} + 1 = \frac{1}{2}\ \{QZU(X - \hat{P}_{t,n})\} + \frac{1}{2}\ (\hat{P}_{t,n} + \hat{D})$$

$$\hat{X} = QZU(X - \hat{P}_{t,n}) + \hat{P}_{t,n}$$

It is readily apparent that the reception decoder performs substantially identical computations except for the fact that, however, in the foregoing equations, the errors in prediction of the form X—Pn must be substituted by the values of the received codes CX and that the functions of the quantization characteristics Q' employed must have functions which are the inverse of those of the transmission code allocator 23 in order to ensure that the following relation $$Q'C((X)) = Q(X - Pn)$$

is always verified.

Figure 7:
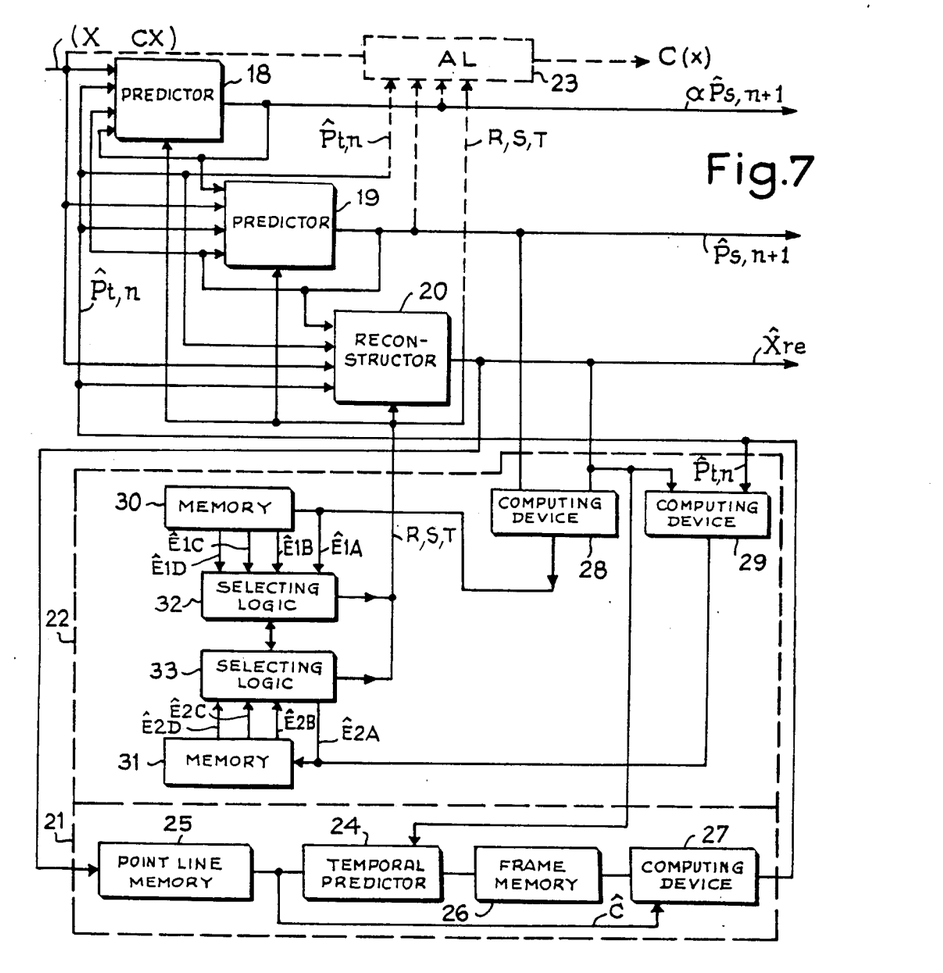
FIG. 7 is a schematic diagram illustrating the principle of construction of a coder or of a decoder in accordance with the invention.
Figure 8:
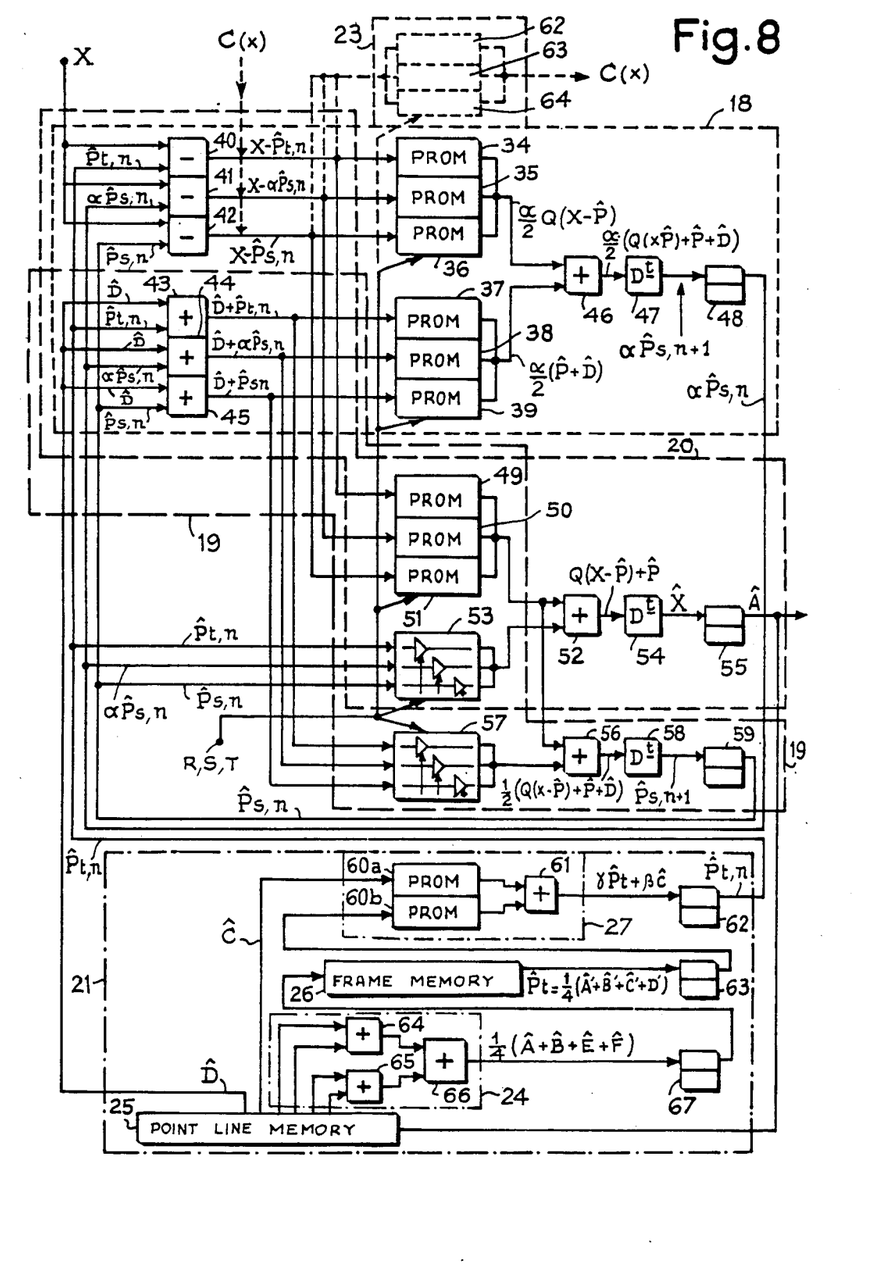
FIG. 8 is a detailed schematic diagram of a coder or of a decoder shown in FIG. 7.

The constructional details of the predictors 18, 19 and 21 as well as the transmitted-data reconstruction device 20 are shown in FIG. 8 within dashed-line rectangles. In FIG. 8, the predictor 18 comprises an array of six programmable read-only memories (PROMs) designated by the references 34 to 39. The memories 34 and 36 each contain a table for quantization of the contour areas. The memories 37 to 39 each contain a table for multiplication of the operand applied to each addressing input thereof by the constant coefficient $\alpha/2$. The memories 34 to 36 are addressed respectively by the outputs of prediction-error computation devices formed by subtracters 40 to 42 which compute the prediction errors, that is to say respectively the temporal errors $X - \hat{P}t,n$ of the fixed uniform areas, the spatial errors $X - \alpha\hat{P}s,n$ of the contour areas and the spatial errors $X - \hat{P}s,n$ of the moving uniform areas. Each datum X is applied to a first input of the subtracters 40 to 42. The temporal prediction Pt,n is applied by the output of the predictor 21 to the second input of the subtracter 40. The estimational prediction $\alpha\hat{P}s,n$ is applied to the second input of the subtracter 41 and the spatial prediction $\hat{P}s,n$ is applied to the second input of the subtracter 42. The memories 37 to 39 are addressed respectively by the outputs of the adding circuits designated by the reference numerals 43 to 45. Each adder receives on a first input the reconstructed datum $\hat{D}$ of the point D of the window shown in FIG. 6; the temporal prediction $\hat{P}t,n$ is applied to the second input of the adder 43; the estimational prediction $\alpha\hat{P}s,n$ is applied to the second input of the adder 44; and the spatial prediction $\hat{P}s,n$ is applied to the second input of the adder 45. Each memory 34 to 39 is selected by the signals R, S, T transmitted by the selecting device 22 of FIG. 7 (not shown in FIG. 8). The data read from the memories 34 to 36 are applied to a first input of an adding circuit 46. The data read from the memories 37 to 39 are applied to the second input of the adder 46. The adder 46 performs the addition of the quantized prediction errors multiplied by $\alpha/2$ read from either of the two memories 34 or 36 to the reconstructed values $\alpha/2$ $(\hat{P}+\hat{D})$ obtained at the output of the memories 37 to 39, where $\hat{P}$ is equal to $\alpha\hat{P}s,n$, $\hat{P}s,n$ or $\hat{P}t,n$, depending on the state of the signals R, S, T. The result of the addition $\alpha/2 \times (Q(X-\hat{P})+\hat{P}+\hat{D})$ is applied to an overflow logic 47 which delivers at its output the estimational prediction error $\alpha\hat{P}s,n+1$, this estimational error being stored within the register 48.

The circuit 20 is comprised of the circuits 49 to 55 as well as the subtracting circuits 40, 42 which are also common to the predictor circuit 18. The circuits 49, 50 and 51 comprise programmable read-only memories (PROMs) and contain the tables for quantization of the uniform areas and of the contour areas. The memories 49 and 51 are addressed respectively by the outputs of the subtracting circuits 40 and 42. The memory 50 contains a table for quantization of the contour areas and is connected by means of its addressing input to the output of the subtracting circuit 41. These memories are selected respectively by the selecting signals R, S, T delivered by the selecting device 22 of FIG. 7. Each datum read from a selected memory 49 to 51 represents the quantized prediction error delivered by the output of one of the subtracters 40, 41 or 42. Each read datum is applied to a first input of the adding circuit 52, the second input of which is connected to the output of a multiplexer 53 which switches to said second input one of the three predictions, namely the temporal prediction $\hat{P}t,n$, the estimational prediction $\alpha\hat{P}s,n$ or the spatial prediction $\hat{P}s,n$ in order to add said prediction to the quantized prediction error obtained from one of the memories 49 to 51. The output of the adder 52 is applied to the input of an overflow circuit 54, the output of which is connected directly to the input of a storage register 55 which stores each result $\hat{X}=Q(X-\hat{P})+\hat{P}$ corresponding to the reconstructed datum X obtained at the output of the adder 52, where $\hat{P}$ is equal to $\alpha\hat{P}s,n$, $\hat{P}s,n$ or $\hat{P}t,n$ according to the state of the signals R, S, T.

The prediction circuit 19 comprises the circuits 56 to 58 and, the adding circuits 43 to 45 which are common to the prediction circuit 18, and the memories 49 to 51 which are common to the circuit 20. The circuit 56 is an adding circuit, the first input of which is connected to the outputs of the memories 49 to 51 and the second input of which receives the data delivered by the outputs of the adders 43, 44 and 45 via a multiplexing circuit 57 controlled by the validation signals R, S, T delivered by the selecting logic 22 of FIG. 7. The output of the adding circuit 56 delivers a prediction value equal to $\frac{1}{2}(Q(X-\hat{P})+\hat{P}+\hat{D})$ to the input of an overflow circuit 58, the output of which is connected to a storage register 59, where $\hat{P}$ is equal as before to $\alpha\hat{P}s,n$, $\hat{P}s,n$ or $\hat{P}t,n$ according to the state of the signals R, S, T.

In addition to the circuits 24, 25, 26 and 27 already illustrated in FIG. 7, the temporal prediction circuit 21 contains the registers 62, 63 and 67. The storage circuit 26 comprises a read/write memory. The computing device 27 performs the operation $\gamma\hat{P}t+\beta\hat{C}$. This device comprises two programmable read-only memories (PROMs) $60_a$ and $60_b$ and an adding circuit 61. The memories $60_a$ and $60_b$ each contain respectively a table for multiplication of the reconstructed datum $\hat{C}$ of the point of the window shown in FIG. 6 by a coefficient $\beta$ and a table for multiplication of the temporal prediction $\hat{P}t$ by a coefficient $\gamma$. The outputs of the memories $60_a$ and $60_b$ are applied respectively to the two inputs of the adding circuit 61 which delivers at its output the result of addition of the product $\gamma.\hat{P}t$ to the product $\beta.\hat{C}$. The result delivered by the adding circuit 61 is stored within the register 62, the value of temporal prediction $\hat{P}t,n$ being obtained from the outputs of said register. The reconstructed value $\hat{C}$ is obtained at the output of the line memory 25 and the value of the prediction $\hat{P}t$ is obtained at the output of the computing circuit 24 for the temporal prediction $\hat{P}t$ via the frame memory and the register 63. The value of the inter-frame prediction which is equal to the arithmetical mean of the reconstructed values of the points A, B, E and F shown within the window of FIG. 6 is obtained at the output of the adding circuit 66, the two inputs of which are connected respectively to the outputs of two adders 64 and 65. The reconstructed values of the points A, B, E, F of the window shown in FIG. 6 are applied to the inputs of said two adders 64 and 65. The value of the inter-frame prediction is stored in the register 67.

Figure 9:
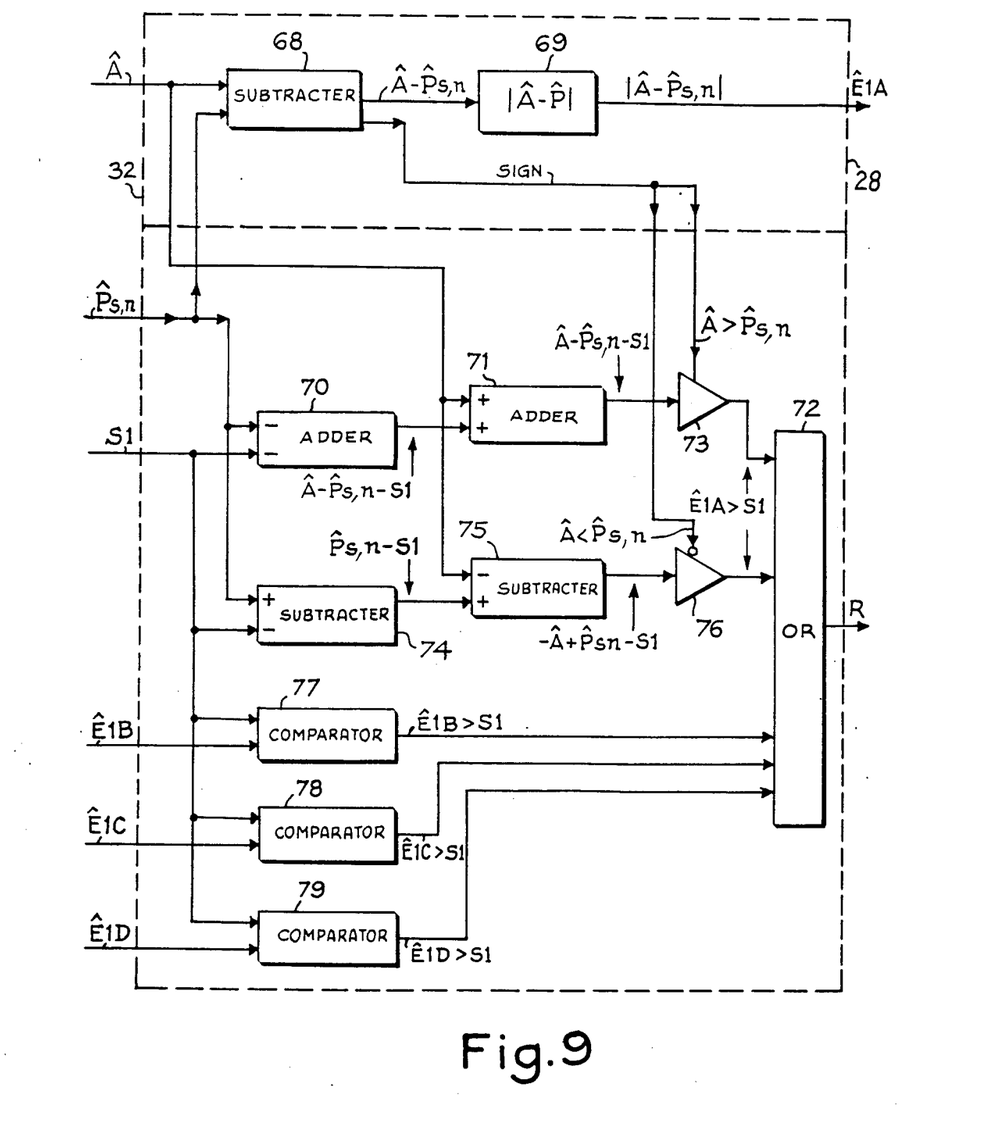
FIG. 9 is a schematic diagram showing the constructional details of the device in accordance with FIG. 7.

The constructional details of the circuits 28 and 30 of FIG. 7 will now be described with reference to the general arrangement diagram of FIG. 9. In this figure, the circuit 28 comprises a subtracting circuit 68 and of an absolute-value computing device 69. The subtracting circuit 68 computes the difference $\hat{A}$ between the values of the reconstructed point A and the value of the prediction $\hat{P}s,n$ and the result of the computation is applied to the input of the absolute-value computing circuit 69 which generates the prediction error $\hat{E}1A$ at its output. The sign of the result obtained at the output of the subtracter 68 is applied to the input of the device 32 for selecting uniform and contour areas. The device 32 comprises a first adding circuit 70 which receives on a first input the prediction value $\hat{P}s,n$ delivered by the predictor 19 and on a second input a contour threshold value S1. The circuit 70 performs the operation $-\hat{P}_{s,n}-S1$ and applies the result of this operation to a first input of an adding circuit 71, the second input of which receives the reconstructed datum $\hat{A}$ delivered by the output of the register 55 of FIG. 8. The result $\hat{A}-\hat{P}_{s,n}-S1$ delivered by the output of the circuit 71 is applied to a first input of a logic OR circuit 72 via a locking circuit 73 which permits transmission of the state of the output of the adding circuit 71 to the first input of the OR circuit 72 when the sign of the difference $\hat{A}-P_{s,n}$ delivered by the subtracter 68 is positive. The circuit 32 also comprises a subtracting circuit 74 which forms the difference $P-S1$ between the value of the prediction $\hat{P}_{s,n}$ applied to its "+" input and the threshold value $S_1$ applied to its "−" input, the difference $\hat{P}_{s,n}-S1$ being applied to the "+" input of a second subtracting circuit 75 which compares this difference with the value of the reconstructed datum $\hat{A}$ applied to its "−" input. The result of the comparison $-\hat{A}+P_{s,n}-S1$ is applied to a second input of the logic OR circuit 72 via a locking circuit 76 which retransmits the result delivered by the output of the subtracter 75 to the second input of the OR circuit 72 when the value of the reconstructed datum $\hat{A}$ is lower than the value of the prediction $P_{s,n}$. The circuit 32 further comprises three other comparator circuits 77, 78 and 79, there being applied respectively to a first input of said comparators the prediction errors which are stored successively in the line memory 30 for prediction errors (shown in FIG. 7), the threshold value S1 being applied to the second inputs of the comparators 77 and 79. The outputs of the comparators 77, 78 and 79 are connected respectively to third, fourth and fifth inputs of the OR circuit 72. The output of the OR circuit 72 emits a binary signal having a logic level "1" corresponding to the signal R when any one of the prediction errors $\hat{E}1A$, $\hat{E}1B$, $\hat{E}1C$ and $\hat{E}1D$ is higher than the predetermined threshold value S1 applied to each of the comparison inputs of the circuits 70, 74, 77, 78 and 79. Said logic level "1" indicates that the scanned point is located on a contour area or highly textured area of the image.

The circuit for selecting uniform and moving areas and generating the signal S comprises circuits which are identical with those described with reference to FIG. 8 and it is consequently unnecessary to dwell at any greater length on the constructional details of the circuit 33. However, it will be noted that, in order to make use of the diagram of FIG. 8 for the construction of the selecting circuit 33, it will be necessary to replace the signals Ps,n and E1A to E1D by the signals Pt,n and E2A to E2D and to replace the first comparison threshold S1 by a second comparison threshold S2.

The circuit for selecting fixed uniform areas and for generating the signal T is not illustrated but can very readily be constructed by means of a NOR gate having two inputs to which the signals R and S will be applied respectively.

What is claimed is:

1. A method of bit-rate compression of digital data transmitted between at least one television transmitter and a televison receiver, the data being representative of the values of luminance and/or of chrominance of each point of a television image and being coded at the transmitter by means of a differential coding device of the type comprising at least one predictor, at least one quantizer, a device for reconstruction of the transmitter data and a code allocator, said data being decoded at the receiver by a differential decoder comprising at least one code converter, a predictor and a device for reconstruction of the transmitted data, wherein said method comprises coding the data relating to each current point to be transmitted by means of a first predictor and a first quantizer when the point belongs to a contour area, coding the data relating to each point of a uniform or slightly textured area by means of at least a second predictor and a second quantizer, and decoding each received data code at the receiver by means by a prediction characteristic providing a prediction value which is identical with the value previously computed at the transmitter for decoding the received data code, in comparing the prediction errors of each predictior of the transmitter and of the receiver with at least one predetermined error threshold value in order to code the current point data at the transmitter by means of different code words of fixed length, depending on whether the results of comparisons of the errors of prediction of the points adjacent to the current point already transmitted to the receiver indicate that the point is in a contour area or in a uniform area and in order to switch the receiver to a predictor which has the same prediction dharacteristic as the predictor employed earlier for coding the current point data at the transmitter.

2. A method according to claim 1, wherein the comparisons between the prediction errors of the predictors of the transmitter and of the receiver are made with respect to at least two different error thresholds comprising a first threshold $S_1$ for identifying the location of each current point of the image in a large-contour area or highly textured area of the image or its location in a uniform area, and of a second threshold $S_2$ for identifying the location of each current point in a moving or stationary uniform area of the image.

3. A method according to claim 2 further comprising the step of switching the transmitter to a quantizer having a quantization characteristic with widely-spaced reconstruction levels and to a predictor having a prediction characteristic which takes into account only the states of the adjacent points in the frame of the current point examined when the current point is located in a large-contour area or highly textured area of the image.

4. A method according to claim 3 further comprising the step of switching the transmitter to a quantizer having a quantization characteristic with closely-spaced reconstruction levels in the vicinity of the zero prediction error when the current point examined is located in a uniform area of the image.

5. A method according to claim 4 further comprising the step of switching the transmitter to an inter-frame predictor which takes into account the states of the adjacent points corresponding to the adjacent points of the current point in the preceding image frame when the current point is located in a stationary uniform area.

6. A method according to claim 5 further comprising the step of switching the transmitter to an intra-frame predictor which takes into account the states of the adjacent points in the frame of the current point when the current point is located in a uniform moving area.

7. A system for bit-rate compression of digital data transmitted between at least one television transmitter and a television receiver in which the data are representative of values of luminance and/or chrominance of each point of a television image and are coded at the transmitter by a differential coding device of the type comprising at least one predictor, at least one quantizer, a device for reconstruction of the transmitted data and a code allocator, and are decoded at the receiver by a differential decoder comprising at least one code converter, a predictor and a device for reconstruction of the transmitted data, the data relating to each current point to be transmitted being coded by means of a first predictor and a first quantizer when the point belongs to a contour area, the data relating to each point of a uniform area or slightly textured area being coded by means of at least a second predictor and a second quantizer and being decoded at the receiver by means of a prediction characteristic providing a prediction value which is identical with the value previously computed at the transmitter for decoding the code of the received data, said device for differential coding of the transmitter comprising a code allocator coupled respectively to the outputs of first, second and third devices for computing prediction errors which compute respectively the spatial prediction errors of the contour areas or highly textured areas of the image, the spatial prediction errors of the uniform areas and the temporal prediction errors of the uniform and fixed areas, the code allocator being controlled by a selecting device which selects one output of the first, second and third devices for computing prediction errors in order to apply a prediction error value to the input of a coding structure of the code allocator in order to code each current point data applied to the input of a predictor in three different fixed-length codes depending on whether the current point is located in a contour area or highly textured area of the image or whether the current point is located in a uniform area which is fixed or in motion.

8. A system according to claim 7, wherein the outputs of the devices for computing prediction errors each address at least one read-only memory containing a table for quantization of the prediction errors, the outputs of each read-only memory being connected to adding circuits, there being applied to the inputs of said adding circuits at least one spatial or temporal prediction value of the point preceding the current point for the purpose of computing the spatial prediction value of the current point when said point is located in a contour area or highly textured area of the image or when said point is located in a uniform area and for the purpose of reconstructing the data relating to the current point applied to the input of the coder.

9. A system according to claim 8, wherein one input of the first prediction error computation device is coupled to the output of a temporal prediction circuit comprising a computing element for computing an arithmetical mean of the values of the reconstructed data of the points corresponding to the adjacent points of the current point in the preceding frame and an adding circuit for adding to the value computed by the computing element at least one reconstructed datum of a point adjacent to the current point within the same frame, the result of the addition being such as to correspond to the temporal prediction value of the current point.

10. A system according to claim 9, wherein the differential receiving decoder comprises predictors for delivering identical prediction values when they are addressed by the codes received from the transmission channel.

* * * * *